US011465864B2

(12) United States Patent
McMurrough et al.

(10) Patent No.: US 11,465,864 B2
(45) Date of Patent: *Oct. 11, 2022

(54) PERCEPTION-BASED ROBOTIC MANIPULATION SYSTEM AND METHOD FOR AUTOMATED TRUCK UNLOADER THAT UNLOADS/UNPACKS PRODUCT FROM TRAILERS AND CONTAINERS

(71) Applicant: Wynright Corporation, Elk Grove, IL (US)

(72) Inventors: Christopher D. McMurrough, Arlington, TX (US); Pavlos Doliotis, Portland, OR (US); Matthew B. Middleton, Northcote (NZ); Alex Criswell, Dallas, TX (US); Samarth Rajan, Dallas, TX (US); Justry Weir, Fort Worth, TX (US)

(73) Assignees: Wynright Corporation, Hobart, IN (US); Daifuku Co. Ltd., Osaka (JP)

( * ) Notice: Subject to any disclaimer, the term of this patent is extended or adjusted under 35 U.S.C. 154(b) by 290 days.

This patent is subject to a terminal disclaimer.

(21) Appl. No.: 16/860,731

(22) Filed: Apr. 28, 2020

(65) Prior Publication Data

US 2020/0324986 A1 Oct. 15, 2020

Related U.S. Application Data

(63) Continuation of application No. 16/506,710, filed on Jul. 9, 2019, now Pat. No. 10,633,202, which is a (Continued)

(51) Int. Cl.
*B65G 67/24* (2006.01)
*B65G 67/02* (2006.01)
(Continued)

(52) U.S. Cl.
CPC ............ *B65G 67/24* (2013.01); *B25J 9/0093* (2013.01); *B25J 15/0616* (2013.01);
(Continued)

(58) Field of Classification Search
CPC ........ B65G 67/24; B65G 61/00; B65G 67/02; B65G 67/20; B65G 2201/025;
(Continued)

(56) References Cited

U.S. PATENT DOCUMENTS 7,317,456 B1 8/2008 Lee
8,469,261 B2 6/2013 Bonner et al.
(Continued)

FOREIGN PATENT DOCUMENTS

WO 2011043674 4/2011

OTHER PUBLICATIONS

International Search Report, PCT/US2015/054079, dated Dec. 22, 2015.
(Continued)

*Primary Examiner* — Thomas Randazzo
(74) *Attorney, Agent, or Firm* — Scott Griggs; Griggs Bergen LLP

(57) ABSTRACT

An automated truck unloader for unloading/unpacking product, such as boxes or cases, from trailers and containers is disclosed. In one embodiment, a mobile base structure provides a support framework for a drive subassembly, conveyance subassembly, an industrial robot, a distance measurement subassembly, and a control subassembly. Under the operation of the control subassembly, an industrial robot having a suction cup-based gripper arm selectively removes boxes from the trailer and places the boxes on a powered transportation path. The control subassembly coordinates the selective articulated movement of the industrial (Continued)

robot and the activation of the drive subassembly based upon a perception-based robotic manipulation system.

20 Claims, 11 Drawing Sheets

Related U.S. Application Data continuation of application No. 15/949,872, filed on Apr. 10, 2018, now Pat. No. 10,343,858, which is a continuation of application No. 15/516,277, filed as application No. PCT/US2015/054079 on Oct. 5, 2015, now Pat. No. 9,938,092.

(60) Provisional application No. 62/059,515, filed on Oct. 3, 2014.

(51) Int. Cl.
| | |
|---|---|
| *B65G 61/00* | (2006.01) |
| *B25J 9/00* | (2006.01) |
| *B25J 15/06* | (2006.01) |
| *G06T 7/00* | (2017.01) |
| *G06T 7/10* | (2017.01) |
| *G06T 15/08* | (2011.01) |
| *G06T 17/00* | (2006.01) |
| *G06T 17/05* | (2011.01) |
| *G06T 17/10* | (2006.01) |
| *B65G 67/20* | (2006.01) |

(52) U.S. Cl.
CPC ............ *B65G 61/00* (2013.01); *B65G 67/02* (2013.01); *G06T 7/00* (2013.01); *G06T 7/10* (2017.01); *G06T 15/08* (2013.01); *G06T 17/00* (2013.01); *G06T 17/05* (2013.01); *G06T 17/10* (2013.01); *B65G 67/20* (2013.01); *B65G 2201/025* (2013.01)

(58) Field of Classification Search
CPC ....... B25J 9/0093; B25J 15/0616; G06T 7/00; G06T 7/10; G06T 15/08; G06T 17/00; G06T 17/05; G06T 17/10
See application file for complete search history.

(56) References Cited

U.S. PATENT DOCUMENTS

| 8,847,954 | B1 * | 9/2014 | Lin | G06T 7/55 |
| | | | | 345/424 |
| 9,102,055 | B1 * | 8/2015 | Konolige | G06V 10/42 |
| 9,589,353 | B2 * | 3/2017 | Halata | B60R 1/00 |
| 9,746,852 | B1 * | 8/2017 | Watts | G05D 1/0248 |
| 9,754,413 | B1 * | 9/2017 | Gray | G06T 17/005 |
| 9,938,092 | B2 * | 4/2018 | McMurrough | G06T 7/00 |
| 10,343,858 | B2 | 7/2019 | McMurrough et al. | |
| 10,455,212 | B1 * | 10/2019 | Konolige | H04N 13/122 |
| 10,633,202 | B2 * | 4/2020 | McMurrough | B65G 61/00 |
| 2005/0151734 | A1 * | 7/2005 | Gubkin | G06T 15/08 |
| | | | | 345/424 |
| 2009/0110522 | A1 * | 4/2009 | Criswell | B65G 47/905 |
| | | | | 901/14 |
| 2012/0194516 | A1 * | 8/2012 | Newcombe | G06T 17/00 |
| | | | | 345/420 |
| 2013/0312371 | A1 | 11/2013 | Ambrose et al. | |
| 2014/0002597 | A1 * | 1/2014 | Taguchi | G06T 7/00 |
| | | | | 348/43 |
| 2014/0184749 | A1 * | 7/2014 | Hilliges | G06T 7/586 |
| | | | | 348/47 |
| 2014/0205403 | A1 * | 7/2014 | Criswell | B25J 9/1697 |
| | | | | 414/809 |
| 2016/0016311 | A1 * | 1/2016 | Konolige | B25J 9/1633 |
| | | | | 901/30 |
| 2016/0063309 | A1 * | 3/2016 | Konolige | G06T 1/0014 |
| | | | | 901/14 |
| 2016/0132059 | A1 * | 5/2016 | Mason | G05D 1/0291 |
| | | | | 701/28 |
| 2016/0288330 | A1 * | 10/2016 | Konolige | G06T 1/0014 |
| 2017/0116779 | A1 * | 4/2017 | Lalish | B33Y 50/00 |
| 2017/0278298 | A1 * | 9/2017 | Hurter | G06T 7/187 |

OTHER PUBLICATIONS

Supplementary European Search Report, Application No. 15847944.4-1017/3201112 PCT/US2015/054079, dated Aug. 31, 2018.

* cited by examiner

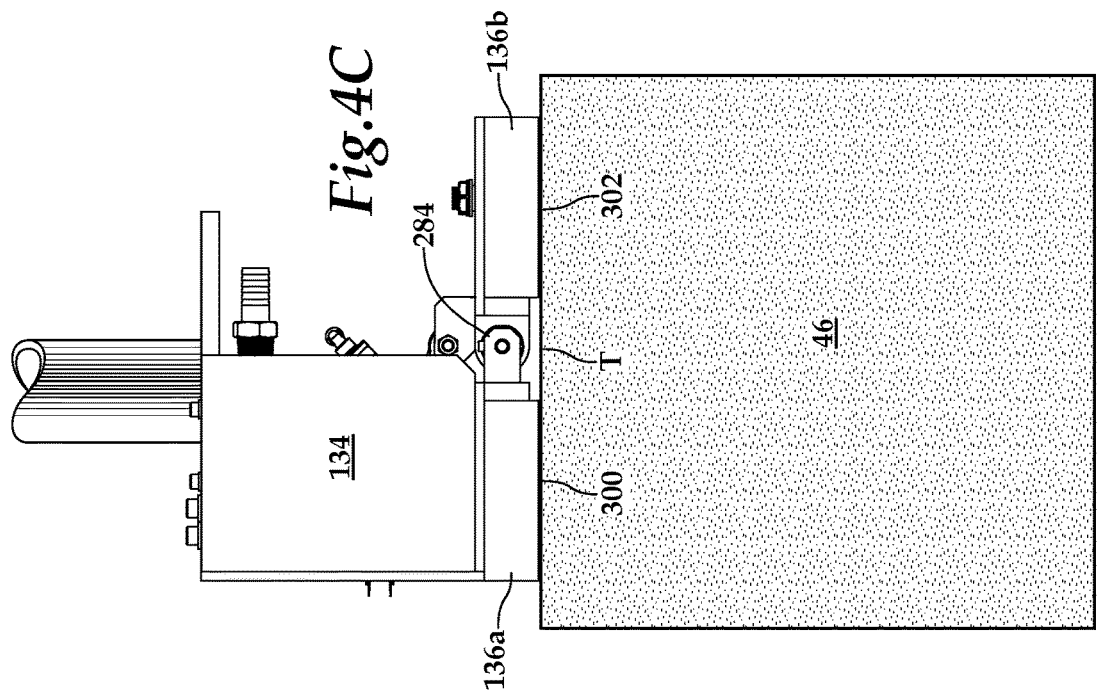
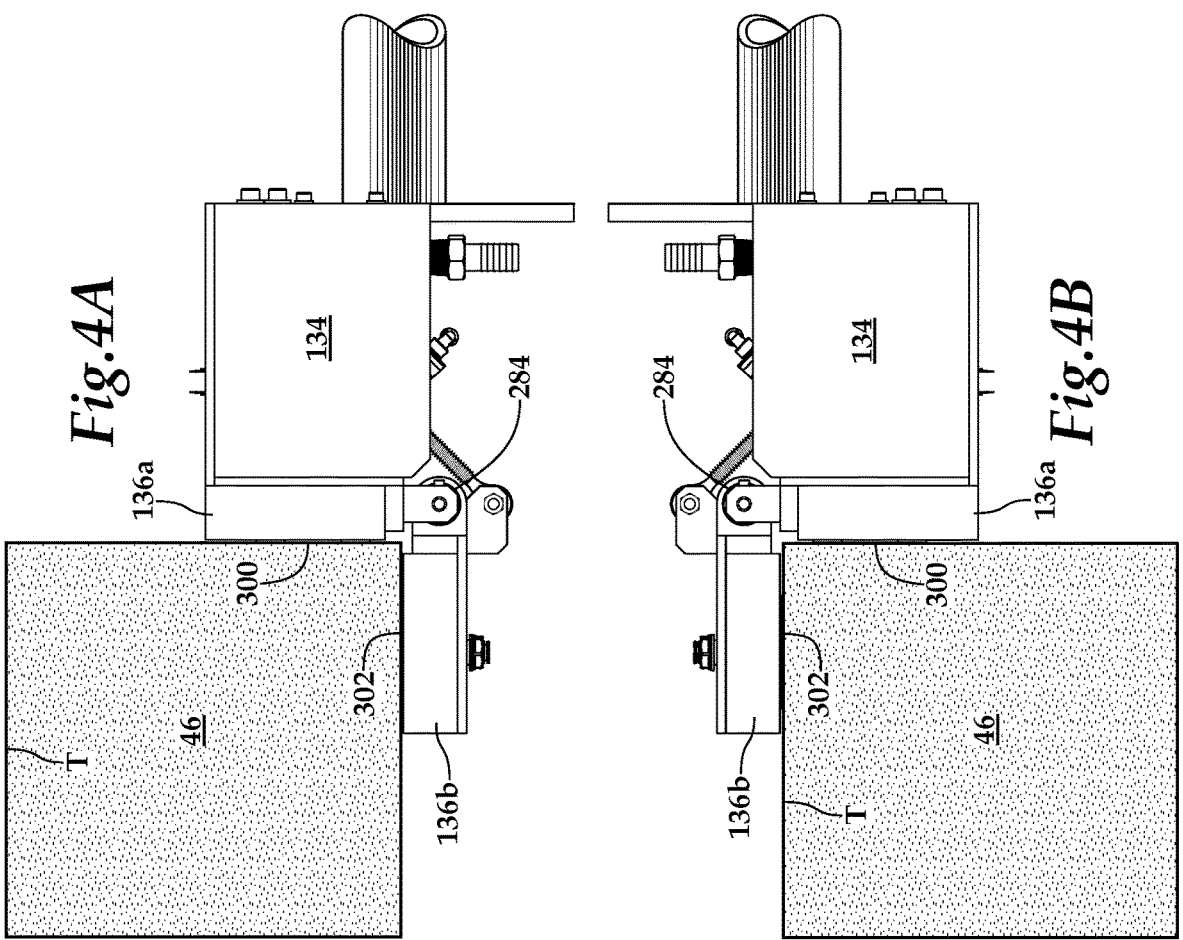

PERCEPTION-BASED ROBOTIC MANIPULATION SYSTEM AND METHOD FOR AUTOMATED TRUCK UNLOADER THAT UNLOADS/UNPACKS PRODUCT FROM TRAILERS AND CONTAINERS

PRIORITY STATEMENT & CROSS-REFERENCE TO RELATED APPLICATIONS

This application is a continuation of U.S. patent application Ser. No. 16/506,710 entitled "Perception-Based Robotic Manipulation System and Method for Automated Truck Unloader that Unloads/Unpacks Product from Trailers and Containers" filed on Jul. 9, 2019, in the names of Christopher D. McMurrough et al., now U.S. Pat. No. 10,633,202, issued on Apr. 28, 2020; which is a continuation of U.S. patent application Ser. No. 15/949,872 entitled "Perception-Based Robotic Manipulation System and Method for Automated Truck Unloader that Unloads/Unpacks Product from Trailers and Containers" filed on Apr. 10, 2018, in the names of Christopher D. McMurrough et al., now U.S. Pat. No. 10,343,858, issued on Jul. 9, 2019; which is a continuation of U.S. patent application Ser. No. 15/516,277 entitled "Perception-Based Robotic Manipulation System and Method for Automated Truck Unloader that Unloads/Unpacks Product from Trailers and Containers" filed on Mar. 31, 2017, in the names of Christopher D. McMurrough et al., now U.S. Pat. No. 9,938,092, issued on Apr. 10, 2018; which is a 371 of Application No. PCT/US2015/054079 entitled "Perception-Based Robotic Manipulation System and Method for Automated Truck Unloader that Unloads/Unpacks Product from Trailers" and filed on Oct. 5, 2015, in the names of Christopher D. McMurrough et al.; which claims priority from U.S. Patent Application Ser. No. 62/059,515 entitled "3D Perception-based Robotic Manipulation System for Automated Truck Unloading" and filed on Oct. 3, 2014, in the names of Christopher D McMurrough et al.; all of which are hereby incorporated by reference, in entirety, for all purposes.

TECHNICAL FIELD OF THE INVENTION

This invention relates, in general, to a machine for handling products and, more particularly, to a perception-based robotic manipulation system and method for automated unloading and unpacking which employs an automated truck unloader designed to unload and unpack product, such as boxes or cases, from trailers and containers.

BACKGROUND OF THE INVENTION

Loading docks and loading bays are commonly found in large commercial and industrial buildings and provide arrival and departure points for large shipments brought to or taken away by trucks and vans. By way of example, a truck may back into a loading bay such that the bumpers of the loading bay contact the bumpers on the trailer and a gap is created between the loading bay and the truck. A dock leveler or dock plate bridges the gap between the truck and a warehouse to provide a fixed and substantially level surface. Power moving equipment, such as forklifts or conveyor belts, is then utilized to transport the cargo from the warehouse to the truck. Human labor is then employed to stack the cargo in the truck. This is particularly true of the unloading of product, such as boxes or cases, from a truck, or freight container, for example. These systems are designed to maximize the amount the cargo unloaded while minimizing the use of human labor to both protect and extend the life of the workforce. Reducing human labor, however, has proven difficult as the configuration and size of the boxes in the truck or freight container cannot be easily predicted in advance. Therefore, a need still exists for improved truck unloading systems that further reduce the use of human labor when unloading or unpacking product, such as cases and boxes, from trailers and containers.

SUMMARY OF THE INVENTION

It would be advantageous to achieve a system and method for automated unloading and unpacking of product, such as cases and boxes, that would enable a trailer or container to be fully unloaded using minimal or no human labor, thereby minimizing the time to unload the truck and the need for human capital. It would also be desirable to enable a robotic computer-based solution that would address this problem, and particularly issues with perception, by unloading and unstacking trailers and containers with boxes and cases of varying sizes. To better address one or more of these concerns, in one embodiment, an automated truck unloader for unloading/unpacking a plurality of product is disclosed. A mobile base structure includes ends and a drive subassembly coupled to the mobile base. The drive subassembly includes multiple for steering and driving the mobile base. A conveyance subassembly is disposed on the mobile base and includes a powered transportation path operable for transporting product between the ends.

An industrial robot is disposed on the mobile base to provide selective articulated movement of an end effector between the powered transportation path and a reachable space such that the industrial robot is operable to handle the product in the reachable space. A visual detection subsystem, which includes a camera, is associated with the industrial robot. In one embodiment, a distance measurement subassembly is provided to determine presence of objects within a detection space, wherein the detection space and the reachable space at least partially overlap. A control subassembly is mounted to the mobile base structure in communication with the drive subassembly, the industrial robot, the camera, and the distance measurement subassembly, in order to coordinate the selective articulated movement of the industrial robot and the activation of the drive subassembly based upon the distance measurement subassembly detecting objects within the detection space, and dimensions of the trailer provided to the control subassembly.

The control assembly includes a memory accessible to a processor and the memory includes processor-executable instructions that, when executed cause the processor to construct a 3-D point cloud model from a plurality of first data images collected by the camera. The 3-D point cloud model is a representation of a physical environment, which includes the product, of the industrial robot. The instructions also cause the process to transform the 3-D point cloud model into a 3-D voxel model and then specify a search operation within the 3-D voxel model to identify a candidate product corner, which may belong to a candidate product of the plurality of product. The processor-executable instructions further include an instruction for the camera to capture at least one second data image of a local area of the physical environment corresponding to the candidate product corner. A dimensioning operation is specified that, based on the at least one second data image, dimensions the candidate product about the candidate product corner. Further instructions that are executed include a removal operation to unload the candidate product and calculate instructions for removing the candidate product. In a further embodiment, a method for unloading/unpacking a product is provided as is a non-transitory computer readable medium having the aforementioned instructions stored thereon.

In another embodiment, an automated truck unloader for unloading/unpacking a plurality of product is disclosed. An industrial robot, which includes a camera, is disposed configured to provide selective articulated movement of an end effector between a powered transportation path and a reachable space such that the industrial robot is operable to handle the product in the reachable space. A control subassembly is located in communication with the industrial robot and the camera, the control subassembly coordinating the selective articulated movement of the industrial robot. The control assembly includes a memory accessible to a processor and the memory including processor-executable instructions that, when executed cause the processor to construct a 3-D point cloud model from multiple first data images collected by the camera. The instructions cause the processor to then transform the 3-D point cloud model into a 3-D voxel model and specify a search operation within the 3-D voxel model to identify a candidate product corner, the candidate product corner belonging to a candidate product of the plurality of product. An instruction for the camera is provided that causes the processor to capture at least one second data image of a local area of the physical environment corresponding to the candidate product corner. The processor then calculates, based on the at least one second data image, instructions for removing the candidate product, and updates the 3-D voxel model with the at least one second data image.

In a further embodiment, an automated truck unloader for unloading/unpacking a plurality of product is disclosed that includes an industrial robot, including a camera, is configured to provide selective articulated movement of an end effector between a powered transportation path and a reachable space such that the industrial robot is operable to handle the product in the reachable space. A control assembly includes a memory accessible to a processor and the memory including processor-executable instructions that, when executed cause the processor to construct a 3-D point cloud model from a plurality of first data images collected by the camera prior to transforming the 3-D point cloud model into a 3-D voxel model. The processor-executable instructions cause the processor to identify segmented planes within the 3-D voxel model using connected component plane segmentation, identify sufficiently sized segmented planes by fitting a minimum area bounding rectangle to each set of inliers for the previously identified segmented planes, and identify a candidate product by selecting one of the sufficiently sized segmented planes with closed edge point to forecasted box corner dimensions. The processor then calculates instructions for removing the candidate product.

These systems and methodologies utilizing the present automated truck unloader therefore maximize the amount the product and cargo unloaded while minimizing the use of human labor to both protect and extend the life of the workforce. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 4A is a side elevation view of one embodiment of an end effector gripping a box in a first gripping position;

FIG. 4B is a side elevation view of the end effector in FIG. 4A gripping a box in a second gripping position;

FIG. 4C is a side elevation view of the end effector in FIG. 4A gripping a box in third gripping position;

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
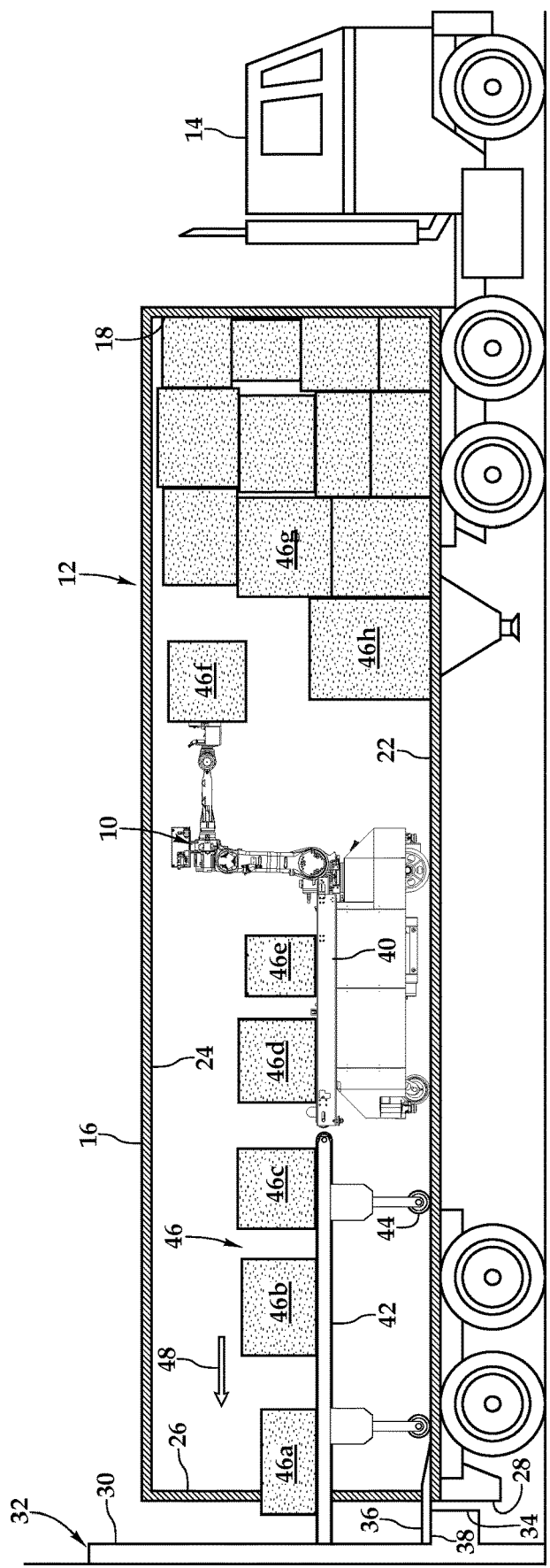
FIG. 1 is a side elevation view with partial cross-section of one embodiment of an automatic truck unloader utilizing a perception-based robotic manipulation system to unload product within a trailer of a truck.

Referring initially to FIG. 1, therein is depicted an automated truck unloader that is schematically illustrated and generally designated 10 and may be referred to as the automated truck unloader. This automated truck unloader 10 is utilized in systems and methods for automated truck unloading and packing of trailers, containers and the like. A tractor trailer 12 having an operator cab 14 is towing a trailer 16 having a front wall 18, two side walls 20A, 20B (best seen in FIGS. 6A through 6D, for example), a floor 22, a ceiling 24, and a rear access opening 26 accessible due to an open door. A bumper 28 of the trailer 16 is backed up to a loading bay 30 of loading dock 32 such that the bumper 28 touches a bumper 34 of the loading bay 30. A dock plate 36 bridges the gap between the floor 22 and a deck 38 of the loading dock 32.

As will be described in further detail hereinbelow, under the supervision of distance measurement subassembly or subassemblies that are components of the automated truck unloader 10, the automated truck unloader 10 maneuvers and drives automatically into the trailer 16 to a position as proximate as possible to the front wall 18. It should be appreciated that although an operator is not depicted as operating the automated truck unloader 10, an operator may be at location 40, an operator platform, although unnecessary. The automated truck unloader 10 operates independently of an operator and an operator is only necessary for certain types of troubleshooting, maintenance, and the like. A telescoping conveyor unit 42 is connected to the automated truck unloader 10. A stream of product 46, in the form standard cases or boxes 46A-46H, which may be of any dimension, is being supplied by the automated truck unloader upon removal thereof, as shown by arrow 48. In particular, the automated truck unloader 10 has already unloaded boxes 46A through 46E, and others, for example, at the intersection of the product 46 proximate the front wall 18 and the floor 22. As shown, the automated truck unloader 10 is unloading box 46f, which will be followed by boxes 46g, 46h and other boxes 46. The automated truck unloader 10 alternates between unloading the product 46 and driving forward to create more opportunities to grip the product 46 between the front wall 18 and the automated truck unloader 10 until the trailer 16 is at least partially unloaded of product 46.

FIG. 2A through FIG. 2D depict the automated truck unloader 10 in further detail. A mobile base 50 supports a drive subassembly 52, a conveyance subassembly 54, an industrial robot 56, a positioning subassembly 58, a safety subsystem 60, and a control subassembly 62, which interconnects the drive subassembly 52, conveyance subassembly 54, industrial robot 56, positioning subassembly 58, and safety subsystem 60. The mobile base 50 includes a front end 64 and a rear end 66 as well as sides 68, 70, a surface 72, and an undercarriage 74.

The drive subassembly 52 is coupled to the undercarriage 74 of the mobile base 50 to provide mobility. As will be discussed in further detail hereinbelow, drive wheel assemblies 78, 80, are disposed on the undercarriage 74 proximate to the sides 70, 68 respectively. A universal wheel assembly 82 is disposed on the undercarriage 74 more proximate to the rear end 66 and centered between the sides 68, 70, respectively. In combination, wheel assemblies 78, 80, 82 provide forward and reverse drive and steering. Retractable stabilization assemblies 84, 86 are also disposed on the undercarriage 74 proximate to the intersection of the end 64 and side 68, the intersection of end 66 and the side 70, respectively. As alluded to, in a forward or reverse drive and steering operation, such as moving into or out of the trailer 16, drive wheel assemblies 78, 80 and the universal wheel assembly 82 are actuated and in contact with the deck 38 of the loading dock 32 while the retractable stabilization assemblies 84, 86 are withdrawn from contact with the deck 38 in a position close to the undercarriage 74. On the other hand, when the automated truck unloader 10 is conducting a product loading or unloading operation, such as during the use of the industrial robot 56, the retractable stabilization assemblies 84, 86 are positioned in contact with the deck 38 to anchor the automated truck unloader 10. It should be appreciated that although the automated truck unloader 10 is being described relative to unloading and unpacking, the automated truck unloader 10 may also be used to load and pack product, including boxes and cases, into a trailer.

The conveyance subassembly 54 is disposed on the surface 72 of the mobile base 50 to provide a powered transportation path 88 operable for measuring, separating, carrying, and stacking, as required by the application and job assignment of the automated truck unloader 10, boxes from the rear end 66 to the front end 64 proximate to the industrial robot 56. As shown, the powered transportation path 88 includes a powered roller conveyor having roller elements 92 which transfer the product or boxes 46 from the industrial robot 56 to a downstream location. The conveyance subassembly 54 as well as the telescoping conveyor unit 42 may also each be equipped with a series of end stop photo eyes to adjust the rate of automatic flow of product through the telescoping conveyor unit 42 and the conveyance subassembly 54. Such an implementation provides a steady and continuous flow of product, maintains proper box or product separation, and prevents unnecessary gaps between the product and product backups and jams.

The industrial robot 56 is disposed at the front end 64 and adapted to provide selective articulated movement of an end effector 130 between the landing platform 94 of the powered transportation path 88 and a reachable space 132 such that the industrial robot 56 is operable to place the product 46 in the reachable space 132. The end effector 130 includes a gripper arm 134 adapted for manipulating product with cooperating and complementary grapplers 136A, 136B. It should be appreciated that any type of end effector 130 may be employed the industrial robot and the choice of end effector 130 will depend upon the product 46 and specific automated truck unloader 10 application. By way of example, the gripper arm 134 with grapplers 136A, 138B is preferred for unloading and unpacking boxes 46A-46H. It should be understood, however, that the product 46 may be any type of good such as other cased or non-cased objects requiring loading.

Figure 2A:
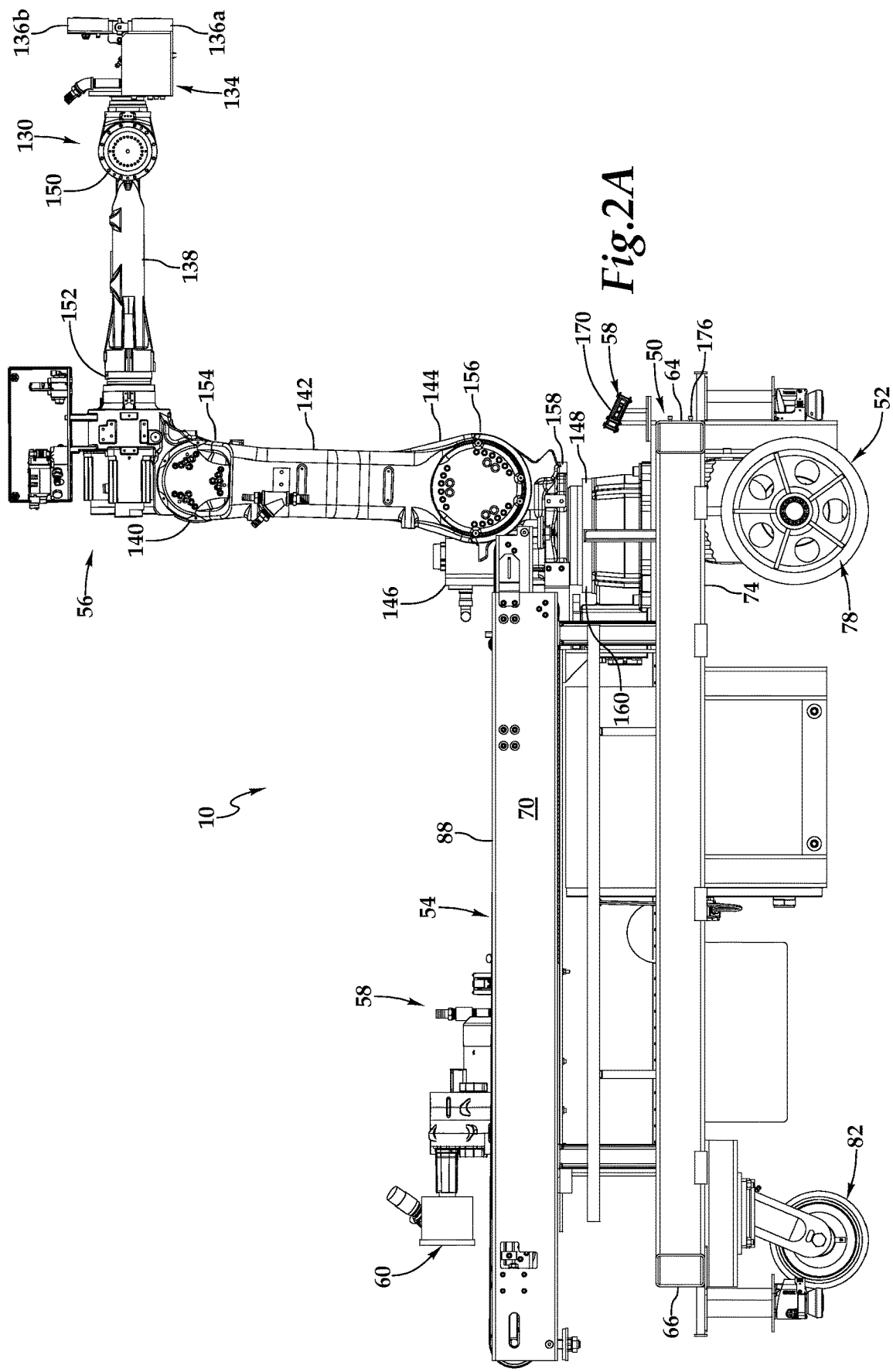
FIG. 2A is a side elevation view of the automatic truck unloader illustrated in FIG. 1.
Figure 2B:
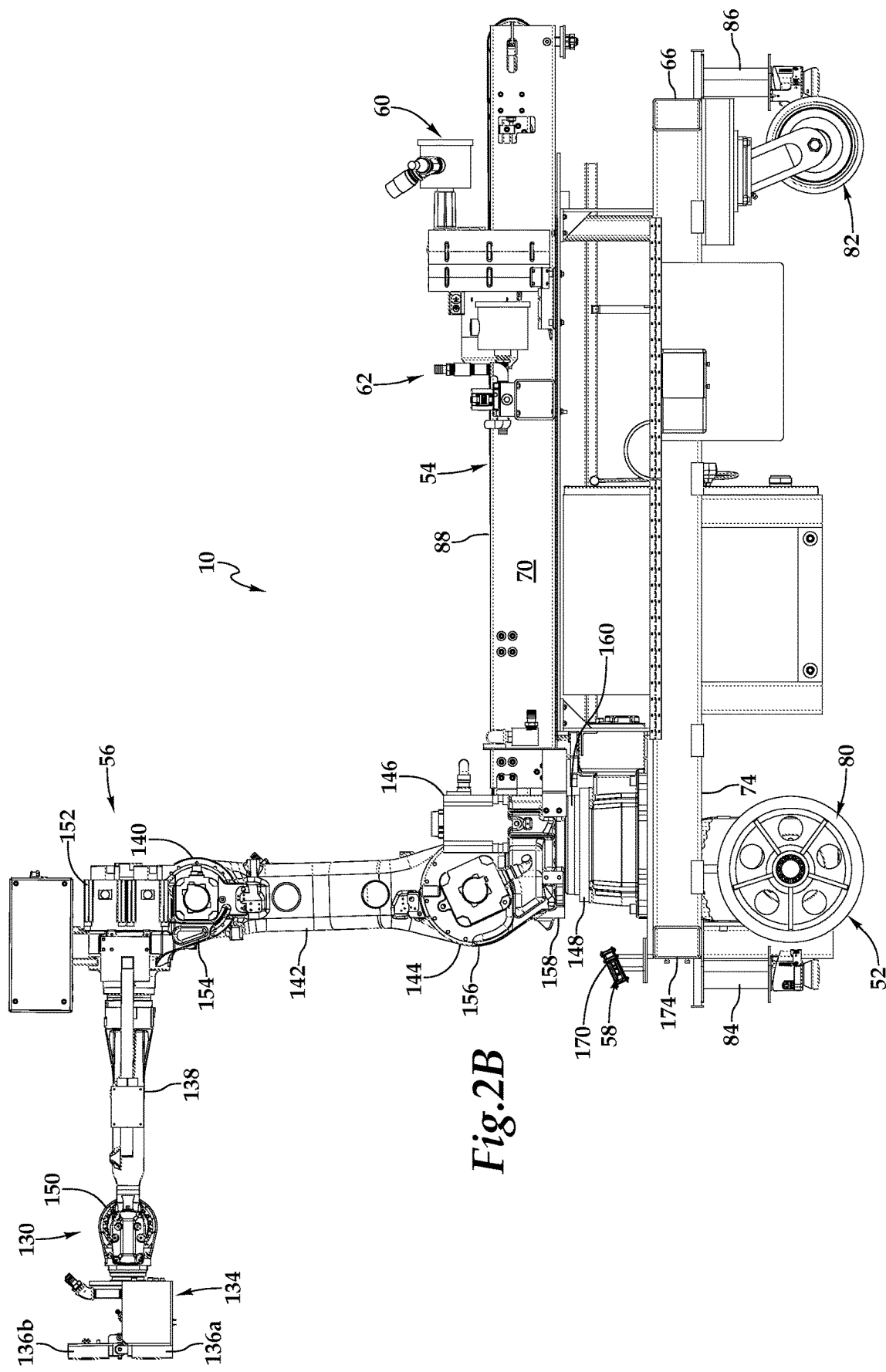
FIG. 2B is a second side elevation view of the automatic truck unloader illustrated in FIG. 1.
Figure 2C:
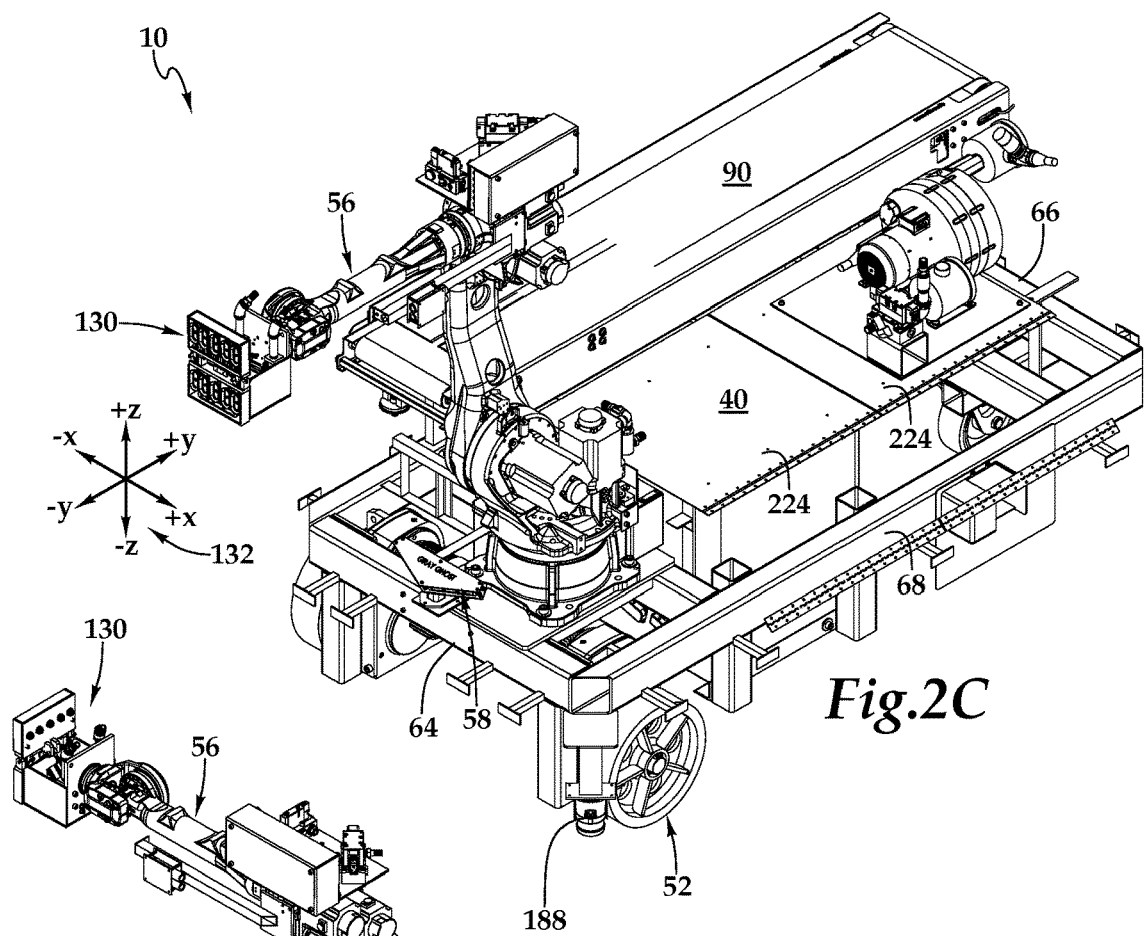
FIG. 2C is a front perspective view of the automatic truck unloader illustrated in FIG. 1.
Figure 2D:
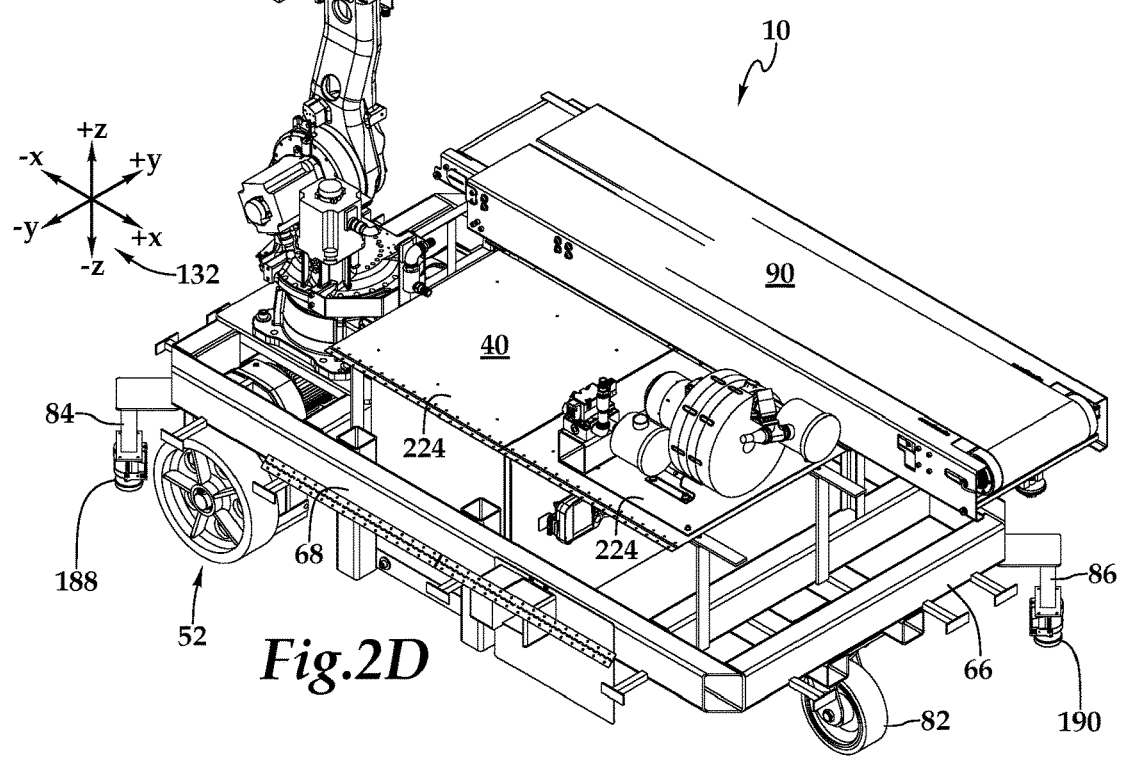
FIG. 2D is a rear perspective view of the automatic truck unloader illustrated in FIG. 1.
Figure 3A:
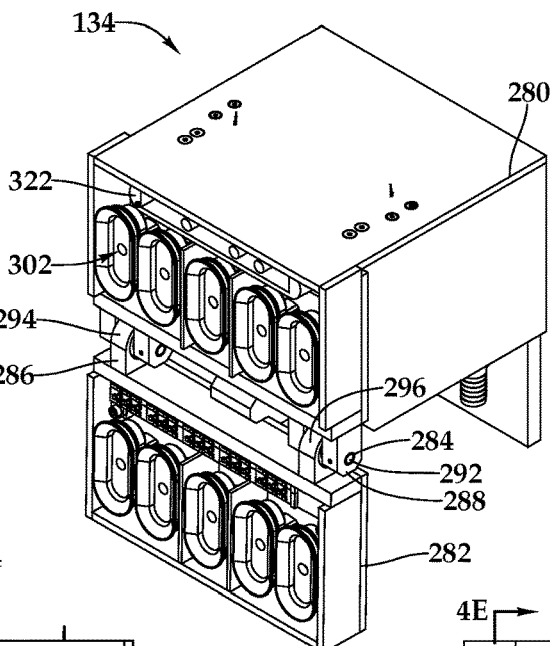
FIG. 3A is a front perspective view of one embodiment of an end effector, which forms a portion of the automatic truck unloader.
Figure 3B:
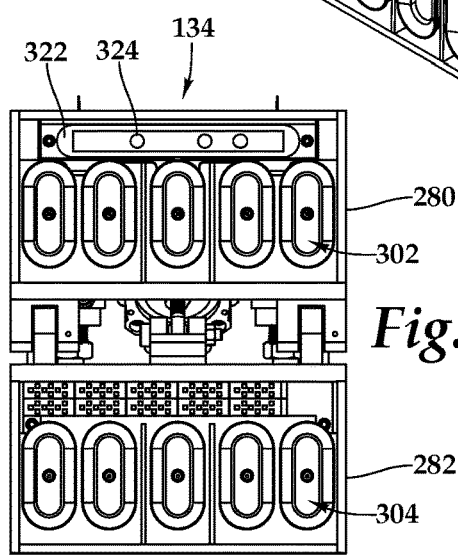
FIG. 3B is a front elevation view of the end effector in FIG. 3A.
Figure 3C:
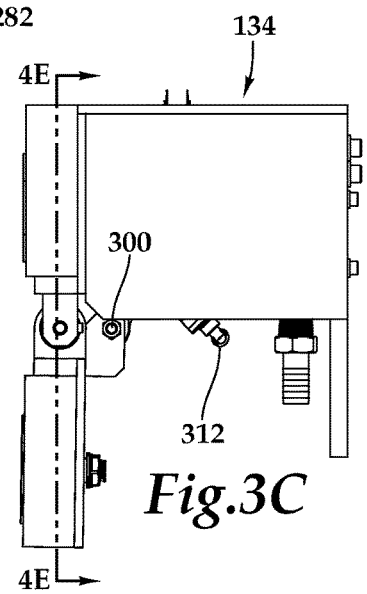
FIG. 3C is a side elevation view of the end effector in FIG. 3A.
Figure 3D:
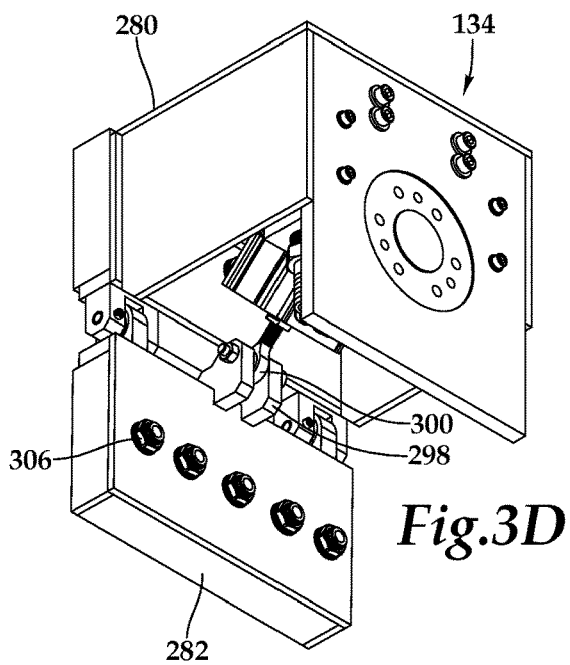
FIG. 3D is a rear perspective of the end effector in FIG. 3A.
Figure 3E:
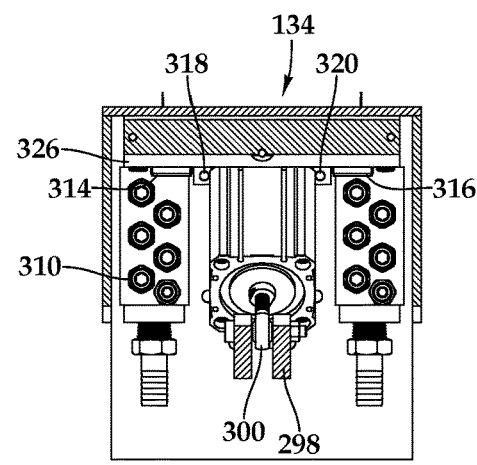
FIG. 3E is a cross-section view of the end effector along line 3E-3E of FIG. 3C.

In one implementation, the industrial robot 56 includes seven segments 130, 138, 140, 142, 144, 146, 148 joined by six joints 150, 152, 154, 156, 158, 160 to furnish selective articulated movement having six degrees of freedom. More particularly, the referenced reachable space 132, as best seen in FIGS. 2C and 2D, is defined by the movement of the industrial robot 56 which provides rotation about six axes including rotary movement of the entire industrial robot 56 about a primary vertical axis; rotary movement of segment 146 having a tower structure about horizontal axis to provide extension and retraction of the segment 144 having a boom arm; rotary movement of the boom arm about the horizontal axis to provide raising and lowering of the boom arm; and selective rotary movement about three wrist axes.

The positioning subassembly 58 is dispersed throughout the mobile base 50. A distance measurement subassembly 170 disposed at the front end 64 of the mobile base 50 measures distance and determines the presence of objects within a detection space which is located in front of the front end 64. In one embodiment, the detection space and the reachable space 132 at least partially overlap. The distance measurement subassembly 170 assists the automated truck unloader 10 with forward and reverse movement and the repositioning of the automatic case loader 10 to create additional empty reachable space 132 for the placement of the product 46. Further, the distance measurement subassembly 170 assists with the coordination and operation of the industrial robot 56. Distance and measurement information gathered by the distance measurement subassembly 170 is provided to the control subassembly 62.

The distance measurement subassembly 170 may be a laser range finding apparatus operating on a time-of-flight measurement basis or principle or a camera system operating on an adaptive depth principle. It should be appreciated, however, that other types of distance measurements are within the teachings of the present invention. By way of example, and not by way of limitation, the distance measurement subassembly may include a laser range finding apparatuses, cameras, ultrasonic measurement apparatuses, inclinometers, and combinations thereof. Similar to distance measurement subassembly 170, distance measurement subassemblies 174, 176 are respectively disposed at the sides 68, 70. The distance measurement subassemblies 174, 176 each may include in one embodiment, detection spaces (not illustrated) to provide measurement and distance information to the control subassembly 62 during traverse movement operations of the automated truck unloader 10.

The safety subsystem 60 is distributed and mounted to the mobile base 50. The safety subsystem 60 may include a light tower which provides a quick indication of the current status of the automated truck unloader 10 to an operator and a wireless operator alert system which contacts pagers or cellular devices of individuals through a wireless network. Also a cage and railing may be included around the operator platform 40 to provide additional safety to the operator. Emergency buttons may be located throughout the automated truck unloader 10 to provide for instant and immediate power down. Front safety scanners 188 and rear safety scanners 190 may be positioned at the front end 64 and the rear end 64 to protect the automated truck unloader 10, people, and product during a collision with an obstacle. Additionally, the front safety bumpers 188 and the rear safety bumpers 190 may include detectors that detect the presence of an object and cause an automatic power down during a collision. Side safety scanners, although not illustrated, may also be utilized. It should be appreciated that other safety features, such as safety bumpers, may be integrated into the automated truck unloader 10.

The control subassembly 62, which is also distributed and mounted to the mobile base 50, may include control station having a user interface disposed at the side 70 near the operator platform 76. As discussed, the drive subassembly 52, the conveyance subassembly 54, the industrial robot 56, the positioning subassembly 58, and the safety subassembly 60 are interconnected and in communication with the control subassembly via a network of concealed and sheathed cables and wires. With this arrangement, the control subassembly 62 may coordinate the manual and automatic operation of the automated truck unloader 10. Further, a visual detection subsystem 162 is associated with the end effector such that the visual detection subsystem 162 captures an image of a product space for processing by the control subassembly, as will be discussed further hereinbelow.

A main frame 200 is constructed of welded steel tubing includes tubular sections which provide a rectangular framework. With reference to the operation of the drive subassembly 52 in conjunction with the mobile base 50, the drive wheel assemblies 78, 80 and universal wheel assembly 82 provide mobility along the length of the automated truck unloader 10. In addition to providing forward and reverse capability, the one embodiment, the drive subassembly 52 may furnish a traverse drive system providing the capability to move the entire automated truck unloader 10 perpendicular to a trailer or fixed object at the loading dock 32.

Referring now to FIGS. 4A through 4E, wherein a gripper arm 134 of the end effector 130 having grippers 136A, 136B is depicted. More particularly, the gripper arm 134 includes a main frame 280 having a support frame 281 for attachment to the industrial robot 56. A moving frame half 282 is selectively pivotally coupled to the main frame 280 by a joint 284 to provide a range of motion between approximately a parallel presentation between the main frame 280 and the moving frame 282 and approximately an orthogonal presentation between the main frame 280 and the moving frame 282. The joint 284 comprises hinge pairs 286, 288 secured by hinge pins 290, 292. Self-aligning ball bearings 294, 296 are respectively located at each of the hinge pairs 286, 288 to provide for improved engagement between the main frame 280, moving frame half 282 and the surface of a product, such as a case or box. A shoulder fastener 298 and ball joint end rod 300, which also couple the main frame 280 to the moving frame half 282, actuate the selective pivotal movement of the moving frame half 282 relative to the main frame 280.

Multiple suction cups 302 are associated with a face 303 of the main frame 280 and, similarly, multiple suction cups 304 are associated with a face 305 of the moving frame half 282. Bulk head fittings 306 secure the multiple suction cups 304 to the moving frame half 282. Within the main frame 280, a paddle cylinder 308, straight fitting 310, and an elbow fitting 312 secure vacuum manifolds 314, 316 within the main frame 280 in pneumatic communication with the suction cups 302, 304. Vacuum sensors 318, 320 are mounted in the main frame 280 proximate to the suction cups 302. A visual detection subsystem 162 is housed in the main frame and includes a camera assembly 322, lighting assembly 324, and a camera mount 326.

Referring now to FIG. 3A through FIG. 4C, in an unloading operation, the vacuum sensors 318, 320 senses for the presence of a box 46. In response to detecting an object, such as a box 46 having a top T, the vacuum sensors 318, 320 actuate the vacuum manifolds 314, 316 to generate a vacuum force to grip the object via the suction cups 302, 304. As shown in FIGS. 5A through 5C, the industrial robot 56 and gripper arm 134 may grip a box 46 in any one of three positions depending on the demands of the unloading or unpacking operation. A bottom-front grip (FIG. 4A), a top-front grip (FIG. 4B) or a top grip (FIG. 4C) may be used.

Figure 5:
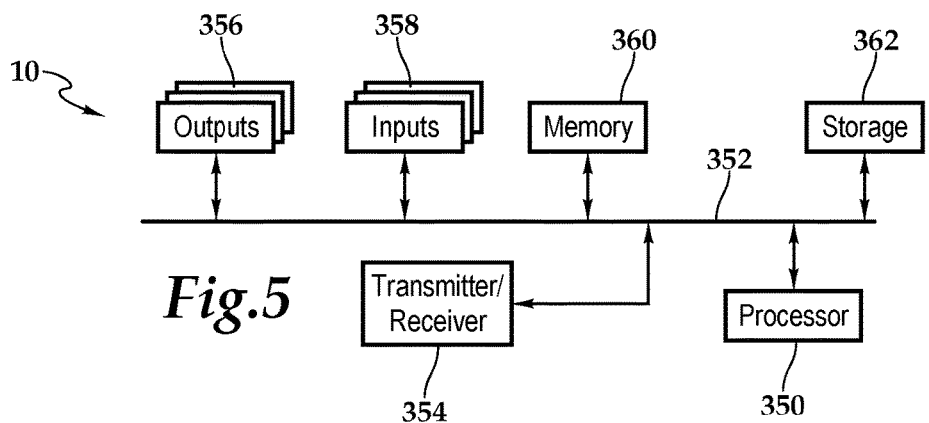
FIG. 5 is a schematic block diagram of one embodiment of the automated truck unloader utilizing a perception-based robotic manipulation system.

FIG. 5 depicts one embodiment of the automated truck unloader 10 in which the automated truck unloader 10 is schematically depicted to include a computer-based architecture including a processor 350 coupled to a bus 352 having transmitter/receiver circuitry 354, outputs 356, inputs 358, memory 360, and storage 362 interconnected therewith. In one embodiment, the control assembly 192 includes the memory 360, which is accessible to the processor 350. The memory 360 includes processor-executable instructions that, when executed cause the processor 350 to execute instructions for unpacking or unloading boxes 46 or other objects. By way of example and not by way of limitation, the instructions may be directed to construct a 3-D point cloud model from a plurality of first data images collected by the camera. The 3-D point cloud model is a representation of a physical environment, which includes the product, of the industrial robot. The instructions also cause the process to transform the 3-D point cloud model into a 3-D voxel model and then specify a search operation within the 3-D voxel model to identify a candidate product corner, which may belong to a candidate product of the plurality of product. With respect to the candidate product corner, more specifically, the instructions cause the processor to identify segmented planes within the 3-D voxel model using connected component plane segmentation before identifying sufficiently sized segmented planes by fitting a minimum area bounding rectangle to each set of inliers for the previously identified segmented planes. The candidate product selected is one of the sufficiently sized segmented planes with closest edge point to forecasted box corner dimensions.

The processor-executable instructions further include an instruction for the camera to capture at least one second data image of a local area of the physical environment corresponding to the candidate product corner. Then, the processor calculates, based on the at least one second data image, instructions for removing the candidate product. More specifically, a dimensioning operation is specified that, based on the at least one second data image, dimensions the candidate product about the candidate product corner. Further instructions that are executed include a removal operation to unload the candidate product and calculate instructions for removing the candidate product. Lastly, the processor-executable instructions update the 3-D voxel model with the at least one second data image. These instructions may iteratively continue.

Figure 6:
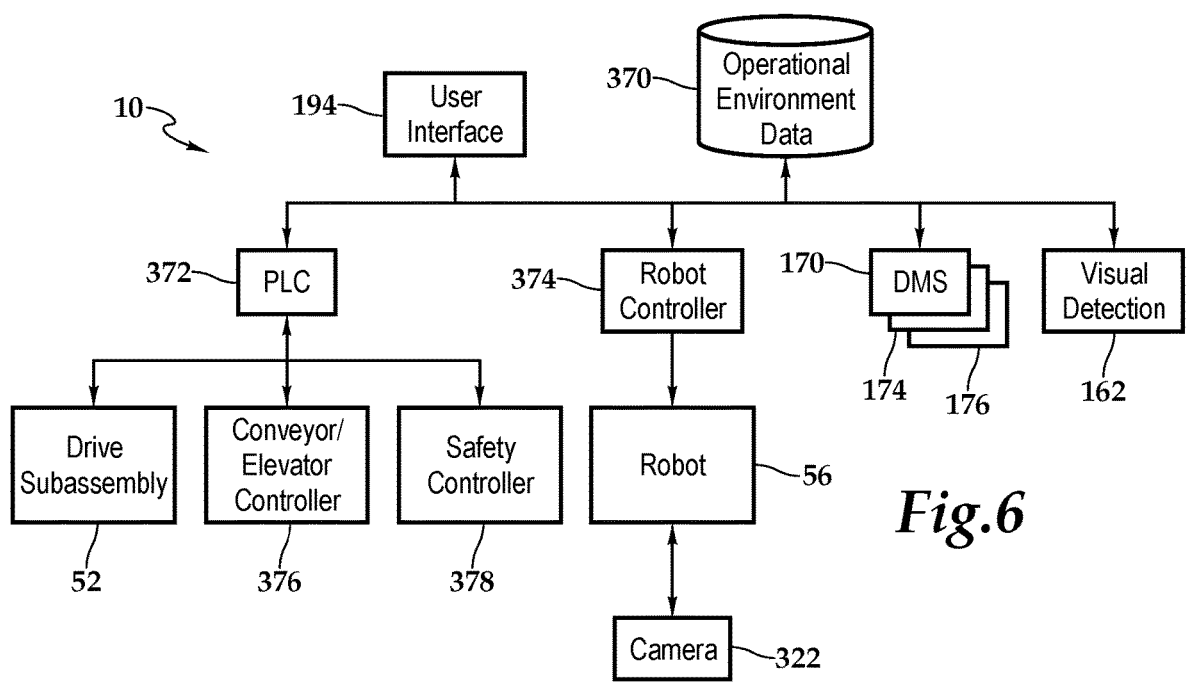
FIG. 6 is a functional block diagram of one embodiment of the automated truck unloader in additional detail.

FIG. 6 depicts one embodiment of the automated truck unloader 10 and the control signals associated therewith, which may be deployed across the computer architecture shown in FIG. 5, for example. The illustrated components coordinate the various functions and operations of the automated truck unloader 10. The user interface 194, operational environment database 370, programmable logic controller 372, robot controller 374, and distance measurement subassemblies 170, 174, 176 are interconnected. The drive subassembly 52, conveyance subassembly 54, as represented by control 376 for conveyors/elevators, and safety controller 378 are connected to the programmable logic controller 372. Finally, the industrial robot 56 is connected to the robot controller 374. In one implementation, the user interface 194, operational environment database 370, and programmable logic controller 372 are part of the control subassembly 62 and the robot controller 374 forms a portion of the industrial robot 56. The safety controller 358 is included in the safety subsystem 60 and provides operation to the aforementioned components of this subsystem.

The user interface 194 provides user control and interaction with the automated truck unloader 10. The user interface 194 may utilize icons in conjunction with labels and/or text to provide navigation and a full representation of the information and actions available to the operator. In addition to loading operations, user interactions may be related to maintenance, repair and other routine actions which keep the automated truck unloader 10 in working order or prevent trouble from arising.

The operational data environment database 370 includes data about the reachable space 132 of the industrial robot 56, stacking methodology data, product information as well as information about the standard sizes of trailers. The product information may be stored in the operational data environment database 350, gathered by the conveyance subassembly 54 as previously discussed, or gained by a combination thereof. By having the standard sizes of trailers pre-loaded, operator time is saved from having to enter this data and performance of the automated truck unloader 10 is improved with this additional information. By way of example, Tables I & II present exemplary examples of type of trailer data that the automatic ruck unloader 10 may utilize in determining position and product placement. It should be appreciated, however, that the automated truck unloader presented herein may operate within pre-loaded information such as the trailer data presented in Tables I & II.

TABLE I

TRAILER DIMENSIONS

| Trailer Type | Length | Inside Width | Inside Height Center | Inside Height Front | Door Opening Width |
|---|---|---|---|---|---|
| 28' (8.5 m) High Cube | 27'3" (8.3 m) | 100" (2.5 m) | 109" (2.8 m) | 107" (2.7 m) | 93" (2.4 m) |
| 45' (13.7 m) Wedge | 44'1½" (13.4 m) | 93" (2.4 m) | 109" (2.8 m) | 106" (2.7 m) | 87" (2 m) |
| 48' (14.6 m) Wedge | 47'3" (14.4 m) | 99" (2.5 m) | 110½" (2.8 m) | 108½" (2.8 m) | 93" (2.4 m) |

TABLE II

TRAILER DIMENSIONS CONTINUED

| Trailer Type | Door Opening Height | Rear Floor Height | Cubic Capacity | Overall Width | Overall Height |
|---|---|---|---|---|---|
| 28' (8.5 m) High Cube | 104" (2.6 m) | 47½" (1.2 m) | 2029 cft (57.5 cm) | 102" (2.6 m) | 13'6" (4.1 m) |
| 45' (13.7 m) Wedge | 105½" (2.7 m) | 50" (1.3 m) | 3083 cft (7.3 cm) | 96" (2.4 m) | 13'6" (4.1 m) |
| 48' (14.6 m) Wedge | 105" (2.7 m) | 48½" (1.2 m) | 3566 cft (101 cm) | 102" (2.6 m) | 13'6" (4.1 m) |

The programmable logic controller 372 coordinates overall operation and switches between various modes of operation including manual and automatic. The programmable logic controller 372 also provides for the high-level calculation and coordination required during automatic operation for items such as the current unload quadrant unloading and steering angel calculations during automatic navigation.

The robot controller 374 controls the motions of the industrial robot 56 through built in inputs and outputs wired through the industrial robot 56 and the end effector 130. It should be appreciated that although a particular architecture is presented for the control of the automatic case loader, other architectures are within the teachings of the present invention. By way of example, any combination of hardware, software, and firmware may be employed. By way of further example, the distribution of control may differ from that presented herein.

In one operation embodiment, the programmable logic controller 372 accesses the dimensions of the trailer 16 from the operational environment database 372. The operator 40 has indicated through the user interface 194 which type of trailer has arrived at the docking bay 30. Alternatively, the distance measurement subassembly 170 is operable to detect this information. The distance measurement subassemblies 170, 174, 176 relay distance and position data to the programmable logic controller 352 which uses this information to send control signals to the robot controller 374, the drive subassembly 52, the controller 372, and the safety controller 378. Additionally, the programmable logic controller 372 receives control signals, which are inputs into the behavior process, from each of these components. Constant updates and status information are provided to the operator 40 by the programmable logic controller 352 through the user interface 194.

Figure 7:
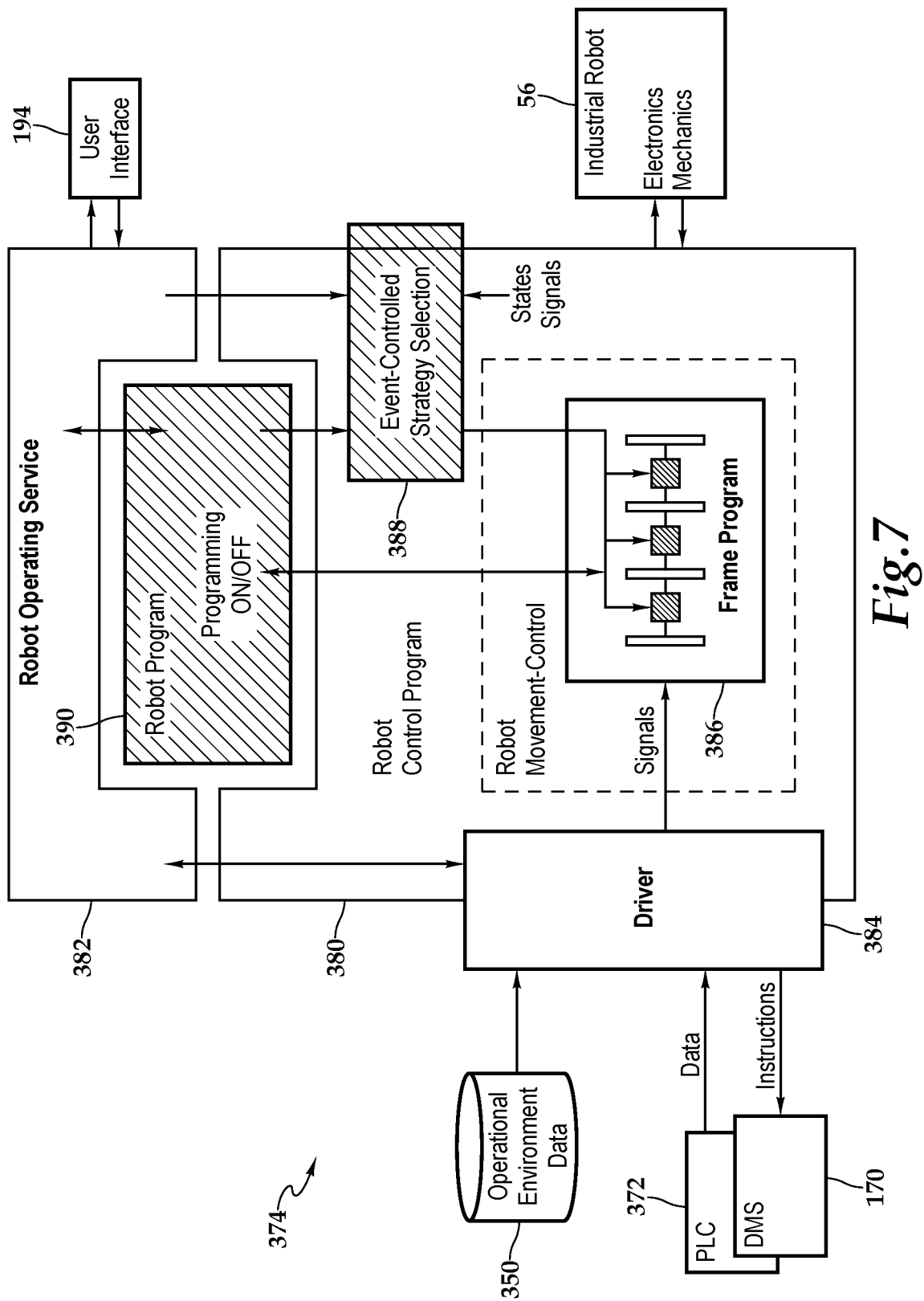
FIG. 7 is a functional block diagram of one embodiment of a robot controller which forms a portion of the automated truck unloader.

FIG. 7 depicts one embodiment of the robot controller 372 which forms a portion of the automated truck unloader 10. The essence of the robot control 372 is a robot system or control program 380, which controls the industrial robot 56. The control program 380 can be operated by the operator 40 by means of an operating service 362 in communication with the user interface 194 and receives input data (as well as provide instructions, as appropriate) from the operational environmental database 370, programmable logic controller 372, and distance measurement subassembly 170 by means of a driver 384. It should be appreciated, that the independence of the robot controller 374 may vary. In one implementation, the robot controller 374 may be under the control of the programmable logic controller 374. In another implementation, as illustrated, the robot controller 374 is more autonomous and may include features such as direct connection to the user interface 194.

According to one embodiment, between the driver 384 and the control program 380 is provided an independent data processing layer in the form of a frame program 386, which controls the robot movements, and a unit 388 for automated or event-controlled strategy or behavioral selection on the basis of the states and signals which occur. User application programs, event-controlled strategy selections and sensor programs in the frame program 386 can be programmed by the operator 40 and directed by a robot program 390, which monitors the balance and implementation of manual and automatic control of the industrial robot 56.

Figure 8:
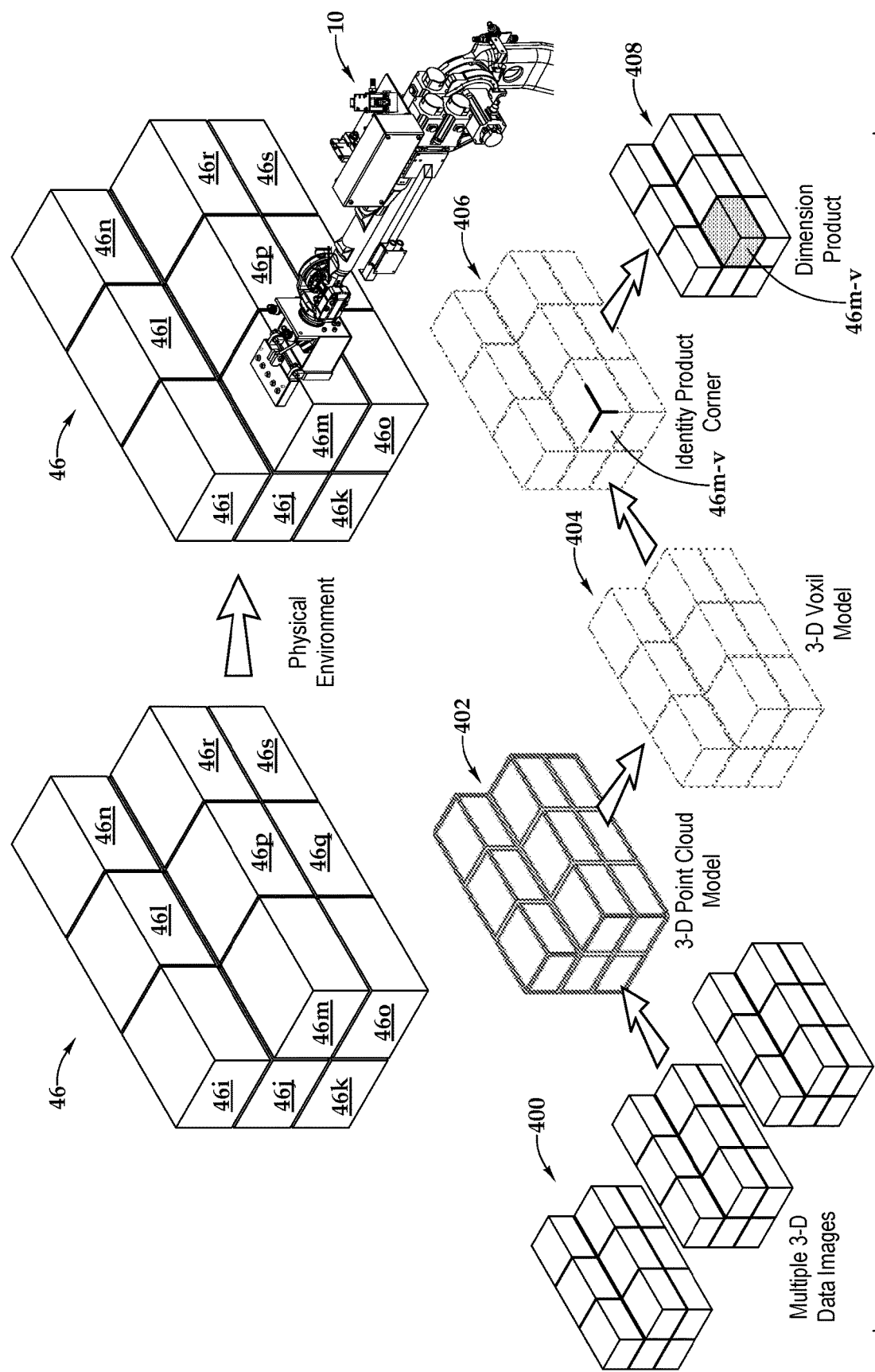
FIG. 8 is a schematic diagram of one embodiment of the perception-based robotic manipulation system.

FIG. 8 depicts one embodiment of the perception-based robotic manipulation system, wherein product is stacked in a physical environment and includes various boxes labeled 46$i$, 46$j$, 46$k$, 461, 46$m$, 46$n$, 46$o$, 46$p$, 46$q$, 46$r$, and 46$s$. The automated truck unloader 10 initially captures multiple data images of the product 46 as represented by multiple 3-D data images 400. The multiple 3-D data images 400 are then converted into a partial 3-D point cloud model 402 and then a fully occupied 3-D voxel model 404. Product corner identification 406 identifies the corner of virtual box 46$m$-$v$, which corresponds to physical box 46$m$, as the next box to be removed. Product dimensioning 408 occurs such that the industrial robot removes product 46$m$ from the stack of product 46.

Figures 9, 10:
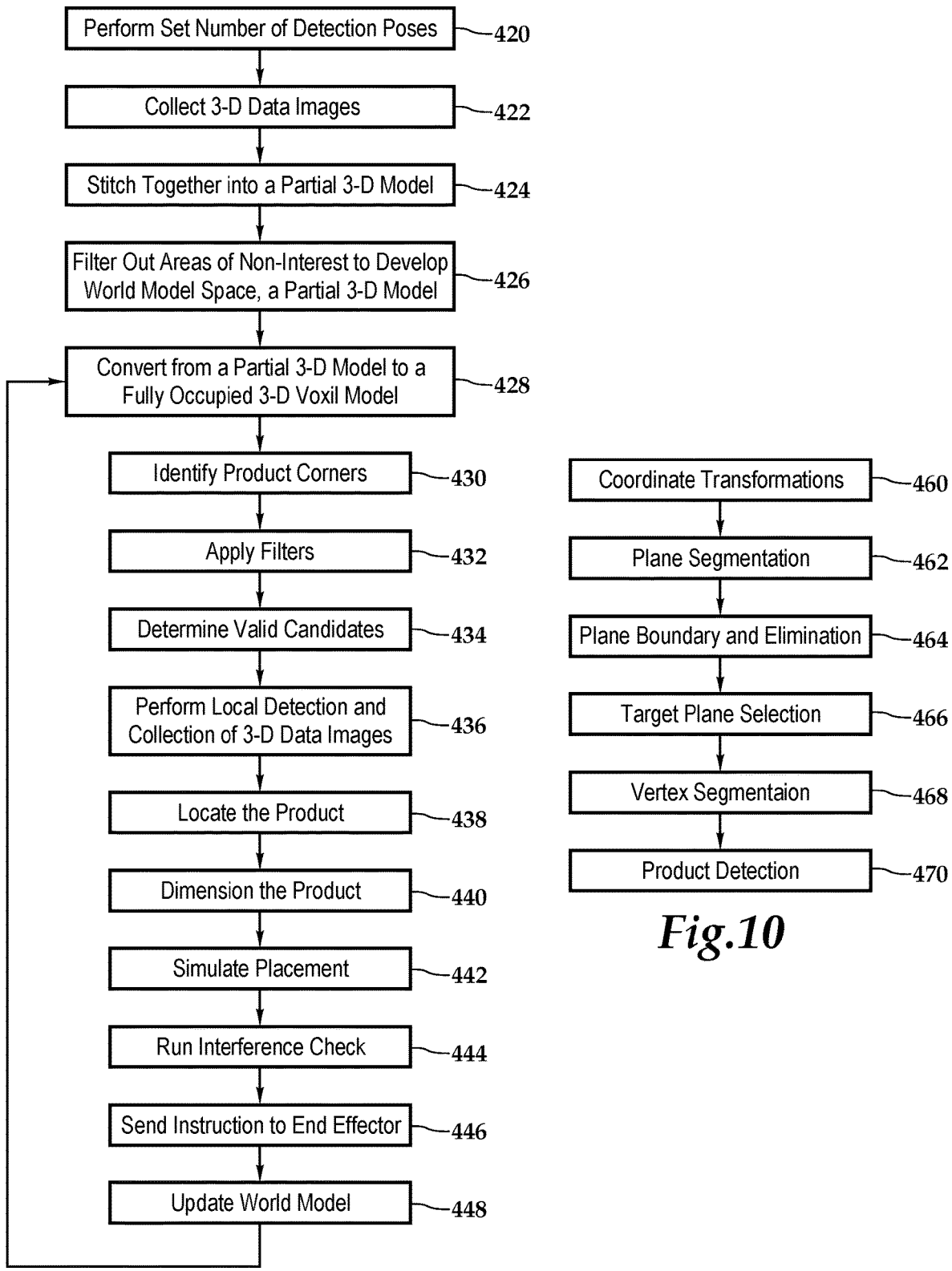
FIG. 9 is flow chart depicting one embodiment of a method for perception-based robotic manipulation.
FIG. 10 is a flow chart depicting one embodiment of a method for perception-based robotic manipulation of product.

FIG. 9 depicts one embodiment of a method for perception-based robotic manipulation. At block 420, a set number of detection poses are performed by the industrial robot. By way of example and not by way of limitation, the industrial robot captures twelve (12) data images from twelve (12) different detection poses that provide different views of the product. At block 422, the 3-D data images are collected from the various detection poses and at block 424, the 3-D data images are stitched together into a 3-D model which may be a partial model and, in one implementation, a partial 3-D point cloud data model. At block 426, areas of non-interest are filtered out within the 3-D model to create a world space model. At block 428, the partial 3-D model is converted into a 3-D voxel model, which in one embodiment is a fully occupied 3-D voxel model. At block 430, candidate product corners are identified and at block 432 applicable filters are applied before a valid candidate is determined at block 434. At block 436, a local detection and collection of a second 3-D data image is performed at the location of the valid candidate. Thereafter, the product is located at block 438 and dimensioned at block 440. At block 442, placement of the product, which may include removal of the product is simulated before an interference check is run at block 444. At block 446, an instruction is sent to the end effector to remove the product, which, as mentioned, may be a box. At block 448, the world model formed at block 428 is updated with the local 3-D data image.

FIG. 10 depicts one embodiment of a method for perception-based robotic manipulation of product. At block 460, coordinate transformations occur. In one embodiment, in order to perform box picking operations using perception data, coordinates observed by the camera are transformed to the reference frame used by the robotic manipulator. By way of example and not by way of limitation, the following coordinate system may be defined:

The camera coordinate system {c}, in which the RGB-D point cloud data is originally expressed The tool coordinate system {t}, located at the end of the manipulator kinematic chain The robot coordinate system {r}, located at the base of the manipulator A homogenous transformation matrix is defined from the camera to tool coordinate systems, $^c_tH$, and from the tool to robot coordinate systems, rtH. The manipulator provides rtH using encoder feedback on the manipulator joints, and $^c_tH$ is may be obtained using a hand-eye calibration procedure. This may be performed offline when the camera is installed on the system, and the resulting transformation is stored for future use. A point originally expressed in the camera coordinate system, cp, can then be transformed to the robot base using Equation 1.

$$rp = {^c_tH} {_rHcp}$$

At block 462, plane segmentation occurs, wherein after the points in the input point cloud are transformed into the robot base, planes are segmented using connected component based plane segmentation. This approach takes advantage of the pixel based organizational structure of RGB-D data to efficiently segment multiple planes in a single image. The segmented plane models can then be represented as:

$$P_i = \{a_i, b_i, c_i, d_i\}$$

where ai, bi, ci, and di are the coefficients of the ith plane when expressed in Hessian normal form ax+by+cz+d=0. Additionally, the jth plane inlier and kth edge point of the ith plane are defined as:

$$P_{i,j}^{inliner} = \{x_{i,j}, y_{i,j}, z_{i,j}\}$$

$$P_{i,k}^{edge} = \{x_{i,k}, y_{i,k}, z_{i,k}\}$$

Once the sets P, pinlier, and pedge, are acquired, each segmented plane is evaluated for target box face candidacy.

At block 464, plane boundary and elimination occurs wherein a fitting of a minimum area bounding rectangle to each set of inliers for the previously segmented planes occurs. The purpose of this step is to aid the target plane selection process by identifying planes that cover an insufficient area (i.e., the plane is too small to contain the smallest possible box face that we wish to detect). In one embodiment, the method of rotating calipers may be used to compute the minimum area bounding rectangles in linear time, after which we remove from consideration any plane with a bounding rectangle side length less than the smallest possible box dimension. For purposes of this step, the lth bounding rectangle coordinate of the ith plane in clockwise order are defined as:

$$p_{i,l}^{rectangle} = \{x_{i,l}, y_{i,l}, z_{i,l}\}$$

The smallest bounding rectangle side si can then be computed using:

$$s_i = \min\{\|P_{i,1}^{rectangle} - P_{i,2}^{rectangle}\|, \|P_{i,2}^{rectangle} - P_{i,3}^{rectangle}\|\}$$

In addition to eliminating planes of insufficient size, also the methodology may choose to eliminate planes with an orientation that deviates more than $$\frac{\pi}{4}$$

radians from an ideal target orientation. This target orientation depends on the camera pose, since we expect to see mostly 'top' box faces when looking from above and 'front' box faces when looking forward toward the stacked boxes. In the case when the camera is looking down upon potential target boxes, the resulting image is expected to contain the top box face with a normal vector pointing in the general direction of the floor bounding plane normal (i.e., in an upward direction). Conversely, when the camera is looking forward toward potential target box, the image is expected to contain the front box face with a normal pointing in the general direction of the rear bounding plane (i.e., pointing straight out of the container). In both cases, removed from further consideration are any planes that sufficiently deviate from the ideal normal. The angular deviation of plane Pi from the target plane normal Ni is computed as:

$$\theta_i = \arccos\frac{\langle a_i, b_i, c_i\rangle N_i}{\|\langle a_i, b_i, c_i\rangle\|\|N_i\|}$$

Using Equations 6 and 7, and the minimum box side length Smin, the final target plane candidacy is computed with the function:

$$\text{candidacy}(i) = \begin{cases} \text{true} & \text{if } \theta_i < \pi/4 \\ & \text{and } s_i < S_{min} \\ \text{false} & \text{otherwise} \end{cases}$$

At block 466, target plane selection occurs where once a set of candidate box face planes has been identified using the preceding steps, a final target plane and its corresponding set of inliers is chosen for further processing. In one embodiment of this step, the euclidean distance of the forecasted box corner location to each of the planar edge points is computed. Of the set of candidate planes not eliminated in the previous steps, the final target plane is chosen to be that which contains the closest edge point to the forecasted box corner. Once the target face plane is selected, we are able to proceed with box vertex detection and orientation estimation. At block 468, vertex segmentation occurs and the final product detection is at block 470.

Figure 11:
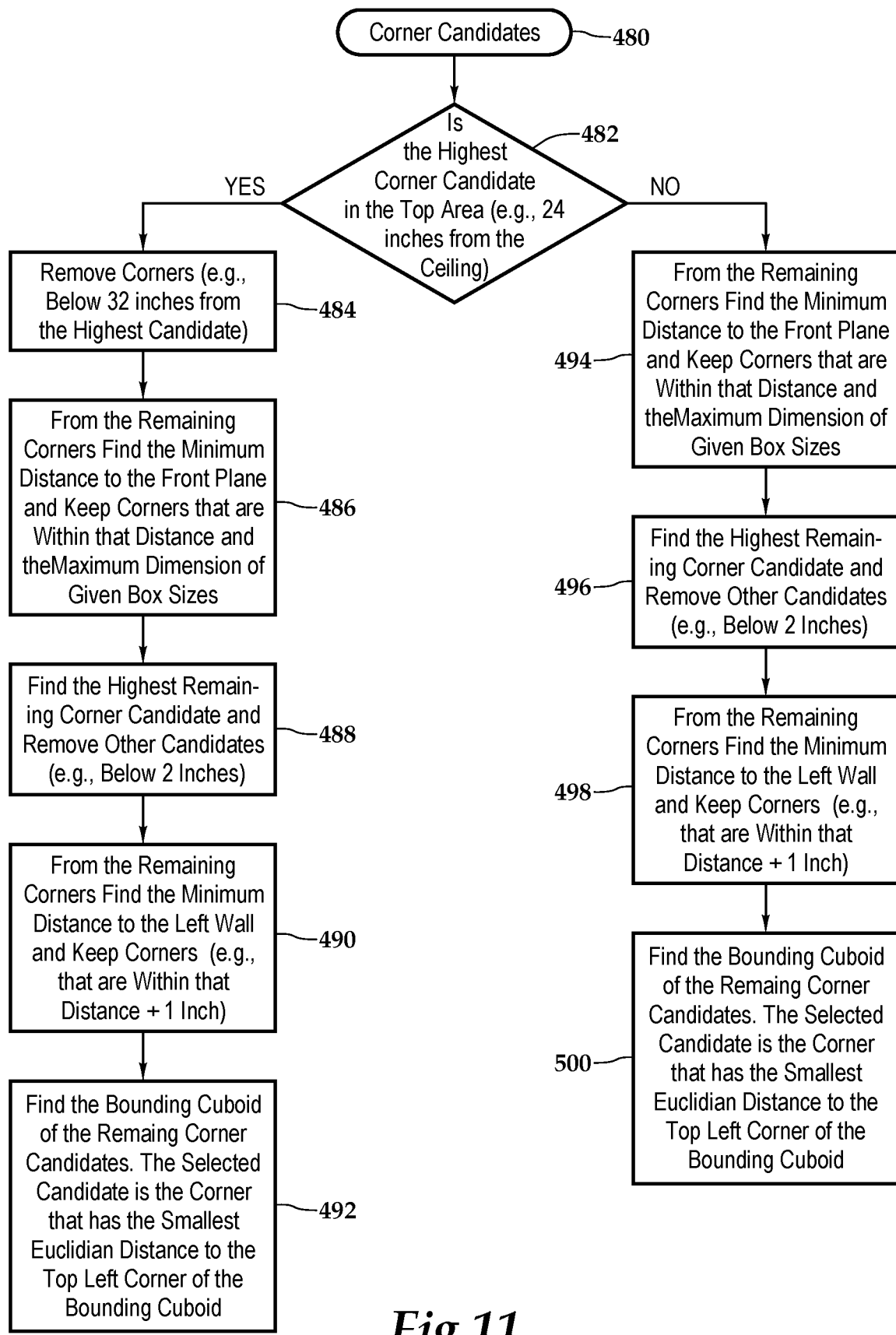
FIG. 11 is a flow chart depicting one implementation of the methodology in FIG. 10 in further detail.

FIG. 11 depicts one implementation of the methodology in FIG. 10 in further detail. At block 480, corner candidates are selected. At decision block 282, if the highest corner candidate in the top area is greater than a threshold distance then the methodology advances to block 484. If not, the methodology advances to block 494 as will be discussed further hereinbelow. In one embodiment, the threshold distance may be defined as 24 inches (60.96 cm). Continuing to block 484, corner candidates are eliminated that have corners more than a threshold distance away, such as 32 inches (81.28 cm). At block 486, from the remaining corner candidates, the minimum distance from the front plane that keeps the corners within the distance and the maximum given box size is determined. At block 488, the highest remaining corner candidates are kept. For example all corner candidates within the top two inches (5.08 centimeters) are retained.

At block 490, from the remaining candidate corners, the minimum distance to the left wall is determined. Candidate corners are kept that are within a certain distance. At block 492, the bounding cuboid of the remaining corner candidate is determined. The candidate corner selected has the smallest Euclidian distance to the top left corner of the bounding cuboid.

Returning to block 494, if the highest corner candidate is not in the top area threshold, then from the remaining corners the minimum distance to the front plane is determined and corners are kept that are within the maximum distance of the given box or product dimensions. At block 496, the highest remaining corner candidates are kept and all other corner candidates are removed that are more than a threshold away, such as 2 inches (5.08 cm). At block 498, from the remaining candidate corners, the minimum distance to the left wall is determined. Candidate corners are kept that are within a certain distance. At block 500, the bounding cuboid of the remaining corner candidate is determined. The candidate corner selected has the smallest Euclidian distance to the top left corner of the bounding cuboid.

The order of execution or performance of the methods and process flows illustrated and described herein is not essential, unless otherwise specified. That is, elements of the methods and process flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method for unloading/unpacking a plurality of product from trailers and containers, the method comprising:
    capturing a plurality of first data images of a physical environment with a camera, the physical environment including the plurality of product;
    constructing a 3-D model from the plurality of first data images collected by the camera, the 3-D model being a representation of the physical environment;
    transforming the 3-D model into a 3-D voxel model;
    specifying a search operation within the 3-D voxel model to identify a candidate product corner, the candidate product corner belonging to a candidate product of the plurality of product;
    capturing, with the camera, at least one second data image of a local area of the physical environment corresponding to the candidate product corner;
    specifying a dimensioning operation, based on the at least one second data image, to dimension the candidate product about the candidate product corner; and specifying a removal operation to unload the candidate product.

2. The method as recited in claim 1, further comprising calculating instructions for removing the candidate product.

3. The method as recited in claim 1, further comprising executing the removal operation to unload the candidate product.

4. The method as recited in claim 1, wherein constructing a 3-D model from the plurality of first data images collected by the camera further comprises constructing a 3-D point cloud model.

5. The method as recited in claim 1, wherein constructing a 3-D model from the plurality of first data images collected by the camera further comprises constructing a partial 3-D point cloud model.

6. The method as recited in claim 1, wherein transforming the 3-D model into a 3-D voxel model further comprises transforming the 3-D model into a full 3-D voxel model.

7. The method as recited in claim 1, wherein transforming the 3-D model into a 3-D voxel model further comprises transforming the 3-D model into a partial 3-D voxel model.

8. The method as recited in claim 1, wherein specifying the dimensioning operation to dimension the candidate product about the candidate product corner further comprises determining one or more features of the at least one second data image based on matching the at least one second data image to a known cuboid model.

9. The method as recited in claim 1, wherein specifying a dimensioning operation to dimension the candidate product about the candidate product corner further comprises defining the location of the candidate product based on discontinuities in the at least one second data image.

10. The method as recited in claim 1, wherein specifying the removal operation to unload the candidate product further comprises specifying the removal operation to unload the candidate product with an end effector.

11. The method as recited in claim 1, wherein specifying the removal operation to unload the candidate product further comprises specifying the removal operation to unload the candidate product with a suction cup-based gripper arm.

12. The method as recited in claim 1, wherein specifying the removal operation to unload the candidate product further comprises specifying the removal operation to unload the candidate product with a suction cup-based gripper arm adapted for manipulating a box with cooperating grapplers that grip the box in a gripping position selected from the group consisting of parallel to the box and perpendicular to the box.

13. A method for unloading/unpacking a plurality of product from trailers and containers, the method comprising:
capturing a plurality of first data images of a physical environment with a camera, the physical environment including the plurality of product;
constructing a 3-D model from the plurality of first data images collected by the camera, the 3-D model being a representation of the physical environment;
transforming the 3-D model into a 3-D voxel model;
specifying a search operation within the 3-D voxel model to identify a candidate product corner, the candidate product corner belonging to a candidate product of the plurality of product;
capturing, with the camera, at least one second data image of a local area of the physical environment corresponding to the candidate product corner; and
specifying a dimensioning operation, based on the at least one second data image, to dimension the candidate product about the candidate product corner.

14. The method as recited in claim 13, wherein specifying the dimensioning operation to dimension the candidate product about the candidate product corner further comprises determining one or more features of the at least one second data image based on matching the at least one second data image to a known cuboid model.

15. The method as recited in claim 13, wherein transforming the 3-D model into a 3-D voxel model further comprises transforming the 3-D model into a full 3-D voxel model.

16. The method as recited in claim 13, wherein transforming the 3-D model into a 3-D voxel model further comprises transforming the 3-D model into a partial 3-D voxel model.

17. The method as recited in claim 13, wherein constructing a 3-D model from the plurality of first data images collected by the camera further comprises constructing a 3-D point cloud model.

18. The method as recited in claim 13, wherein constructing a 3-D model from the plurality of first data images collected by the camera further comprises constructing a partial 3-D point cloud model.

19. A method for unloading/unpacking a plurality of product from trailers and containers, the method comprising:
capturing a plurality of first data images of a physical environment with a camera, the physical environment including the plurality of product;
constructing a 3-D model from the plurality of first data images collected by the camera, the 3-D model being a representation of the physical environment;
transforming the 3-D model into a 3-D voxel model;
identifying a candidate product corner within the 3-D voxel model, the candidate product corner belonging to a candidate product of the plurality of product;
capturing, with the camera, at least one second data image of a local area of the physical environment corresponding to the candidate product corner; and
specifying a dimensioning operation, based on the at least one second data image, to dimension the candidate product about the candidate product corner.

20. The method as recited in claim 19, wherein constructing a 3-D model from the plurality of first data images collected by the camera further comprises constructing a model selected from the group consisting of 3-D point cloud models and partial 3-D point cloud models.

* * * * *